United States Patent Office 3,529,148
Patented Sept. 15, 1970

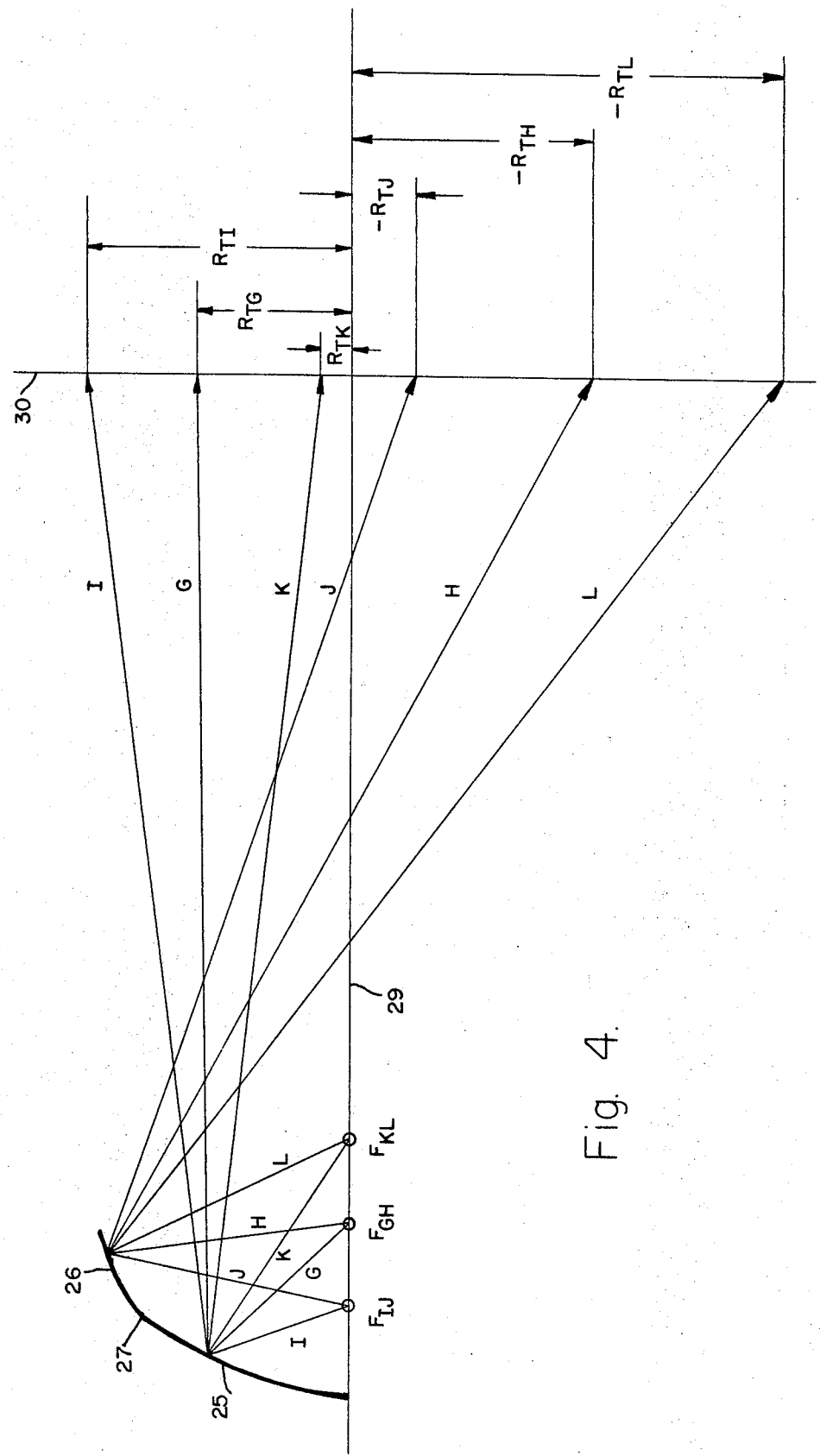

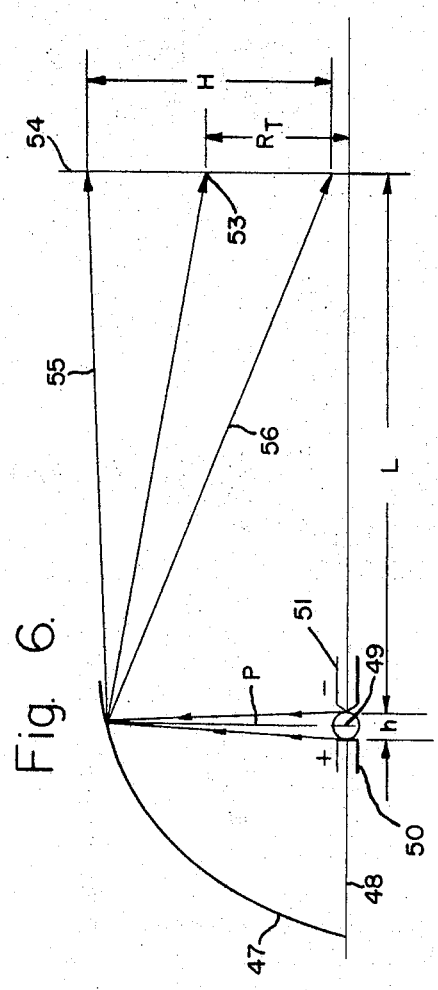
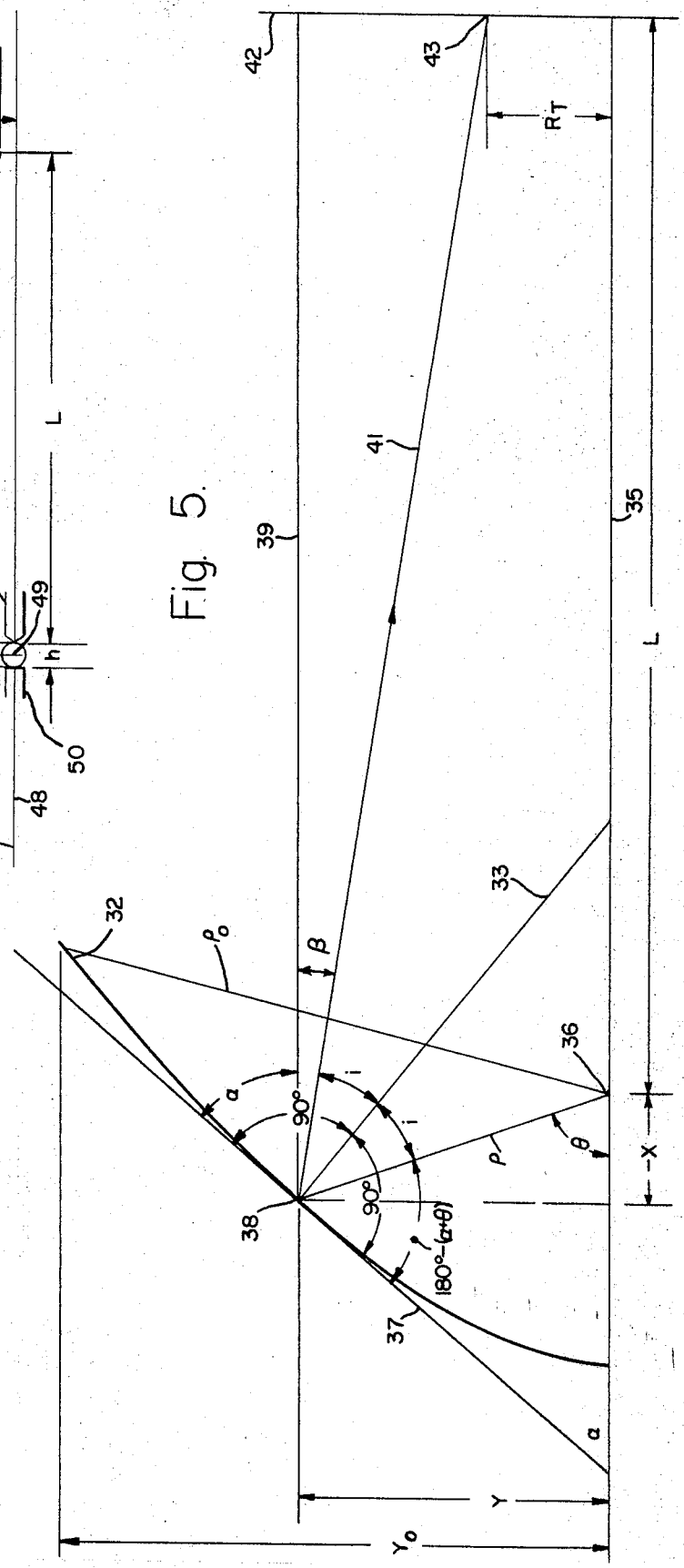

3,529,148
COLLECTOR AND METHOD FOR PRODUCING A NEARLY UNIFORM DISTRIBUTION OF FLUX DENSITY ON A TARGET PLANE PERPENDICULAR TO THE OPTICAL AXIS
Nicholas M. Stefano, Rolling Hills Estates, and Allan D. le Vantine, Tarzana, Calif., assignors to TRW, Inc., Redondo Beach, Calif., a corporation of Ohio
Filed Dec. 13, 1967, Ser. No. 690,285
Int. Cl. F21v 7/00, 7/09
U.S. Cl. 240—41.35   25 Claims

ABSTRACT OF THE DISCLOSURE

A collector having a curved surface for producing a nearly uniform distribution of flux density from a radiant source on a target plane perpendicular to the optical axis of the collector. The collector is formed of two adjoining curved reflecting surfaces each producing an image of the radiant source in the form of a circular band at selected portions on the target plane. The curved surfaces produce circular bands having complementary flux density fields whereby the form of the fields is nearly uniform over the circular target.

BACKGROUND OF THE INVENTION

The invention relates to a reflecting collector for producing uniformity of illumination on a target plane or second focal plane perpendicular to the optical axis from a radiant power source generally within the collector.

In this invention, the uniformity of illumination on the target plane is accomplished by selectively distributing images of a radiant source from a multiple of individual elemental surface areas or portions of the collector onto corresponding selected portions of the target plane at the required projected distance. The individual surface portions are adjoining so as to provide an integral reflecting surface. The method for making the present collector required the development of techniques to describe images of the source in a manner in which they could be evaluated, sorted, selected and projected to a position on the target plane so that the sum of their flux densities would be nearly constant or uniform.

SUMMARY OF THE INVENTION

The invention is the provision of collector curves which produce a nearly uniform beam or a beam having maximized uniformity on the target plane and the methods for producing the same. The location of the source image on the target plane from an elemental surface of a collector was achieved by the control of the slope of that element surface. Each elemental surface of the collector was conceived as a concentric circular band about the axis of the optical system. The flux densities on the target plane were also defined as in a series of concentric circular rasters or elemental areas.

The source selected for a particular collector design was a 20 kw. xenon compact arc lamp which produces a luminous semi-transparent radiant mass with a very bright spot near the cathode. The appearance of the physical size and shape of the source does not change significantly at angles up to 35° on either side of a perpendicular to the electrode axis.

It was ascertained that the peak brightness and the center line brightness of the source are proportional to input power, whereas the brightness at other locations varies nonlinearly with the input power. This is borne out in that the size of the luminous-mass (source plasma) changes with the input power. The brightness distribution contours vary from lamp to lamp and a specific collector can be designed around only one source. However, a collector according to the invention can be made for any source.

The invention is particularly useful in a solar simulator to provide a radiant beam of uniform flux density on a target within a space simulator. Accordingly, objects of the invention are to provide an improved collector and methods for determining the contour of the reflective surface thereof.

Further objects and advantages of the invention may be brought out in the following part of the specification, wherein small details have been described for the competence of disclosure, without intending to limit the scope of the invention which is set forth in the appended claims.

BRIEF DESCRIPTION OF THE DRAWINGS

Referring to the accompanying drawings, which are for illustrative purposes:

FIG. 4 is a diagrammatic view illustrating collector curves made according to the invention having two distinct surface areas, one directing images of the source to the positive side of the collector axis and the other to the negative side of the collector axis;

FIG. 5 is a diagrammatic view illustrating a portion of the plane geometry of a collector and its relationship with the target plane, according to the invention;

FIG. 6 is a diagrammatic view of a portion of a collector according to the invention illustrating the relationship between an arc length of the illumination source and its magnification on the target plane produced by an incident ray along the latus rectum.

DESCRIPTION OF THE PREFERRED EMBODIMENTS

Figure 1:
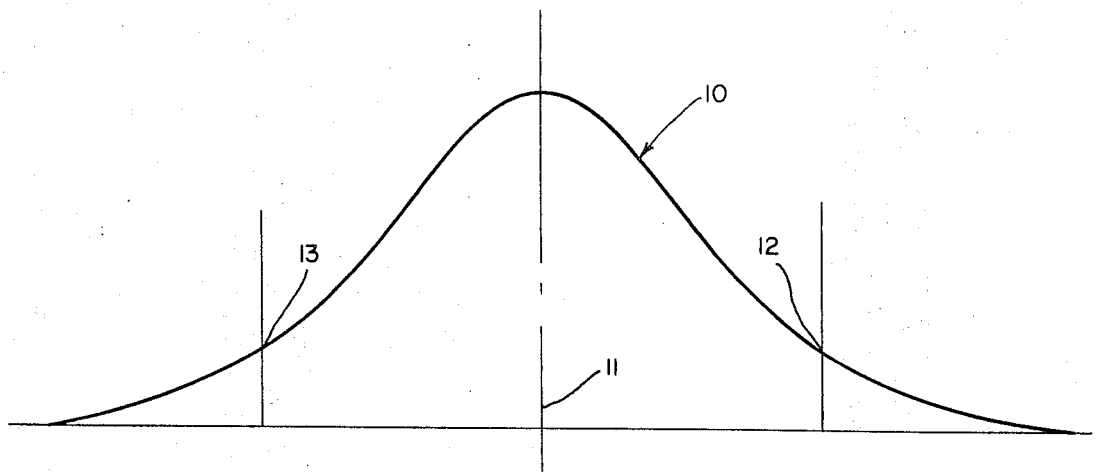
FIG. 1 is a diagrammatic view illustrating the flux density produced by typical prior art collectors on a target plane.
Figure 2:
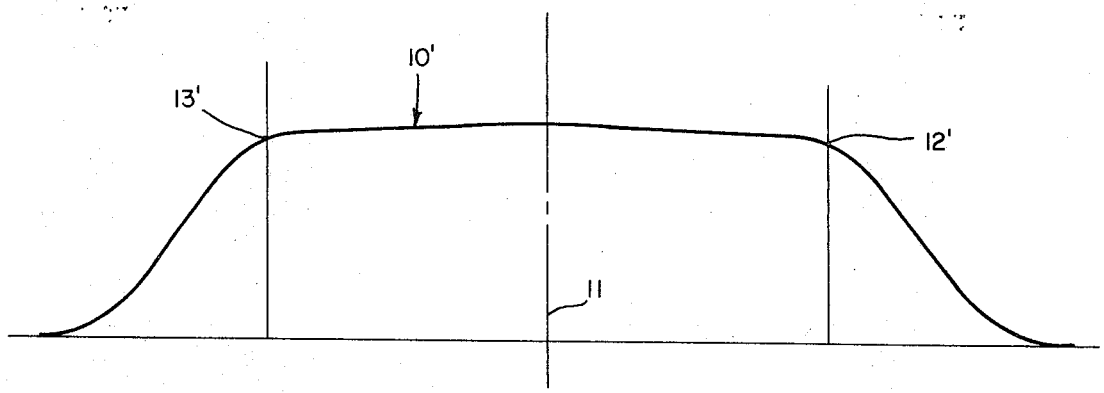
FIG. 2 is a diagrammatic view illustrating the flux density produced at the second focal plane by a collector made according to the invention.

Referring again to the drawings, there is shown in FIG. 1 a flux density profile 10 produced by a typical prior art ellipsoidal collector on a second focal plane. From such a collector, there is much greater intensity of the density at the optical axis 11 than at the edges of the field, indicated as 12 and 13. In FIG. 2, there is shown a flux density profile 10' produced by a collector according to the present invention at the target plane. There is a substantial uniformity of light between edges 12' and 13' as compared with the intensity of light at the optical axis 11.

Figure 3:
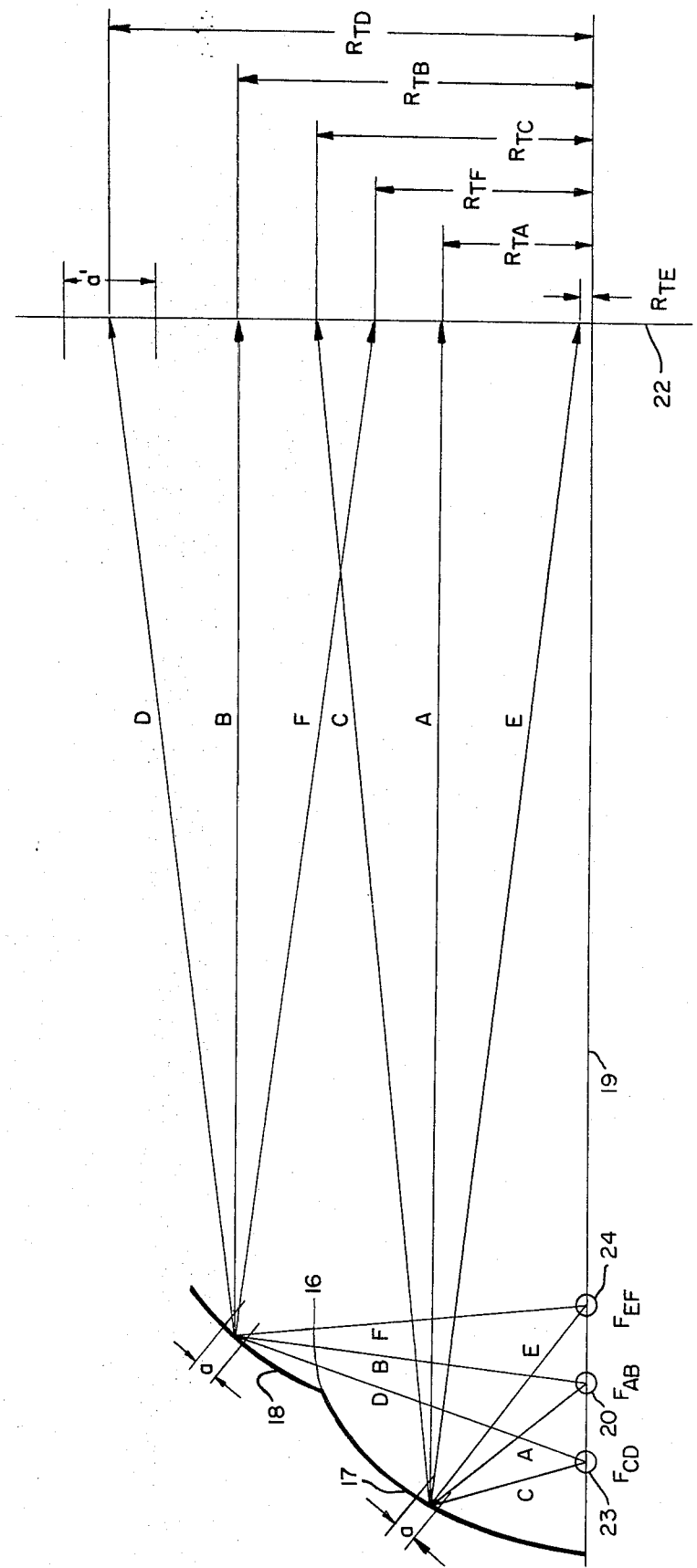
FIG. 3 is a diagrammatic view illustrating collector curves made according to the invention having two distinct surface areas directing images of the source to the positive side of the collector axis.

To determine a collector configuration, according to the invention, there is shown in FIG. 3 the upper half of an annular reflector having two distinct adjoining curves 17 and 18 in cross section and having an optical axis 19. On the optical axis there is shown a hot spot 20 of a radiant power source. To produce circular bands of light on a target plane 22 at a predetermined distance from the hot spot 20, incident rays A and B are produced at the focal point and reflected from the respective curves 17 and 18 from which they are aimed to specific points on the target plane, the points being indicated by the radial distances from the axis, as $R_{TA}$ and $R_{TB}$. When the hot spot of the source is imaged along radii $R_{TA}$ and $R_{TB}$, the full image of the source between points 23 and 24 is distributed in an annular manner across the surface of the target, illuminating the target. The flux density of the radiation from incremental annular areas $a$ of the collector curves 18, 17 illuminating the target is evaluated at specific annular target bands, such as the band of width $a$ about the axis 19. From every elemental area of the curves 17 and 18 there is reflected radiation from the source to the target, and for each elemental area there can be described a flux density distribution within each of the circular bands $a'$.

The curve 17 aims the image of the hot spot to a central area of the target 22 at $R_{TA}$ while the curve 18 aims the image of the hot spot to a more peripheral area of the target at $R_{TB}$. A cusp 16 is formed in the collector surface at the junction of the curves 17 and 18, and there is a discontinuity in the aiming direction from one side of the cusp to the other. This abrupt change in the aiming of the hot spot of the source to the target is termed a jump function.

The extreme ends of the arc length are shown on the optic axis 19 as indicated at 23 and 24. From these points reflective rays, such as C and D or E and F, are reflected to various points, as $R_{TC}$, $R_{TD}$, $R_{TE}$ and $R_{TF}$. The flux density from these points is calculated for all annular rings such as that of width $a'$ on the target plane 22, and similarly for all points between 23 and 24, lying on and off the optic axis 19.

The curves 17 and 18, when made according to the invention, are designed so that the summations of all flux density distributions within each circular band on the target 19 are nearly equal.

In FIG. 3, the images of the hot spot on the target from curve 18 are in a positive direction on the same side of the axis 19 with respect to the images of the hot spot produced by curve 17. This is considered to be a positive jump function.

Figure 3A:
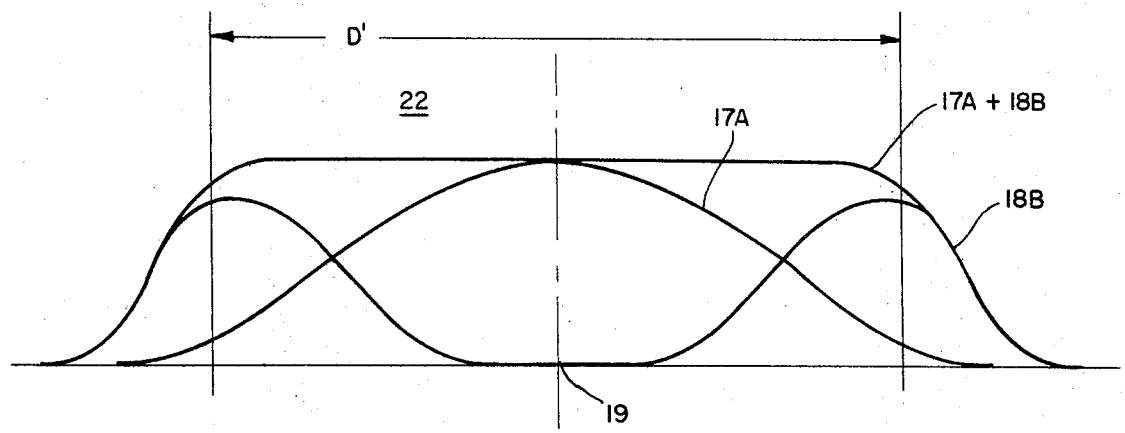
FIG. 3A is a flux density diagram illustrating the flux density produced from reflective rays A and B of the source and the sum of their flux densities on the target plane.
Figure 3B:
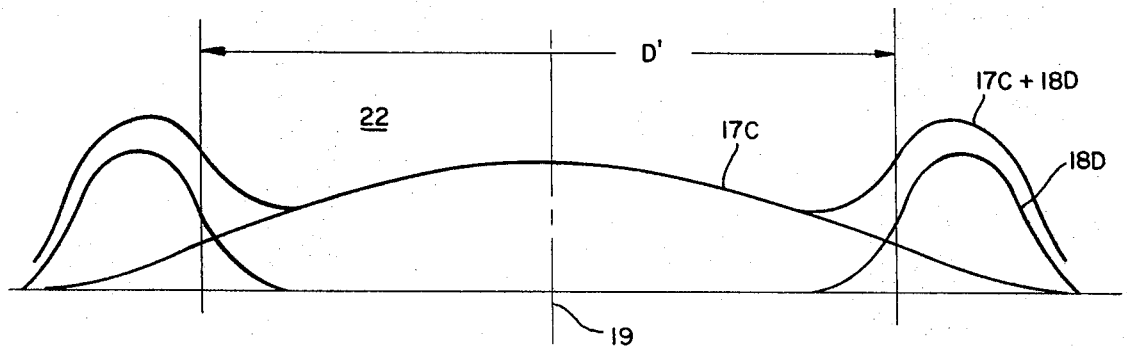
FIG. 3B is a diagram similar to that shown in FIG. 3A, illustrating the flux densities from reflective rays C and D and their sum.
Figure 3C:
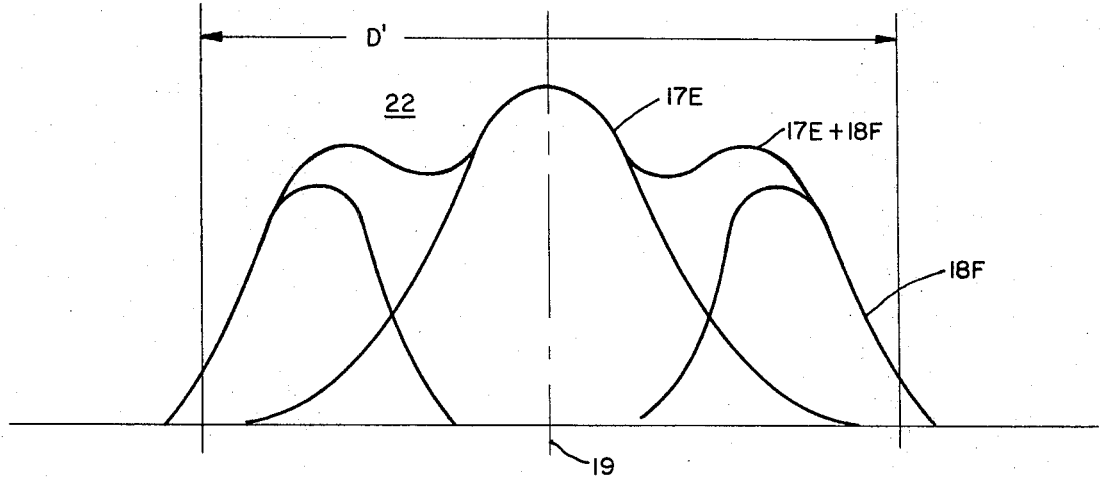
FIG. 3C is a flux density diagram illustrating the flux densities of reflective rays E and F and their sum on the target plane.

In FIGS. 3A, 3B and 3C, there are shown curves indicating the flux densities diametrically across the target plane 22 as formed by the reflective rays from a collector having the curve 17 and 18. FIG. 3A shows the flux density distribution within diameter D' when the hot spot of the source is located at 20 in FIG. 3. The flux density distribution from the surface of curve 17 is 17A and the flux density distribution from the surface of curve 18 is 18B. The sum of the two is 17A+18B. Similarly, FIG. 3B shows the distribution when the hot spot is moved toward a point 23, the density distribution from the curve 17 being indicated by 17C, from the curve 18 by 18D, and their sum being 17C+18D. FIG. 3C shows the distribution when the hot spot is moved toward a point 24, the density distribution from the curve 17 being indicated by 17E, from the curve 18 by 18F, and their sum being 17E+18F. FIGS. 3B and 3C illustrate undesirable distributions on the target, whereas in FIG. 3A, the density curves illustrate a substantially optimum uniform distribution. The distinguishing features of these curves is such that axial adjustment of the hot spot for maximum uniformity is readily achieved.

In FIG. 4, there are shown two curves 25 and 26 in cross section joined at a cusp 27 and which are curves of an annular collector around an optical axis 29. The difference between the curves shown in FIGS. 3 and 4 is that one of the curves in FIG. 4, as 26, reflects rays as H, J and L to the lower or negative side of the axis to points on the target plane 30 of circular bands having negative mean radii $R_{TJ}$, $R_{TH}$ and $R_{TL}$. This is a novel concept in the invention where the hot spot of the light source, as from a focal point $F_{GH}$, is imaged at radii $+R_{TG}$ and $-R_{TH}$, the ray H being reflected from the collector on the positive side of the optical axis to the target 30 on the negative side, to provide a negative jump function.

Similar relationships occur at the ends of the arc length at points at $F_{IJ}$ and $F_{KL}$. At the former, the ray I is reflected from the collector above the optical axis or on the plus side to produce a circular band having a mean radius at $+R_{TI}$ and the ray J produces a negative radius $R_{TJ}$ or a circular band on the target plane. A like relationship occurs with rays K and L where the jump function between the two curves 25 and 26 produces circular bands having a positive radius $R_{TK}$ and a negative radius $R_{TL}$.

Figure 4A:
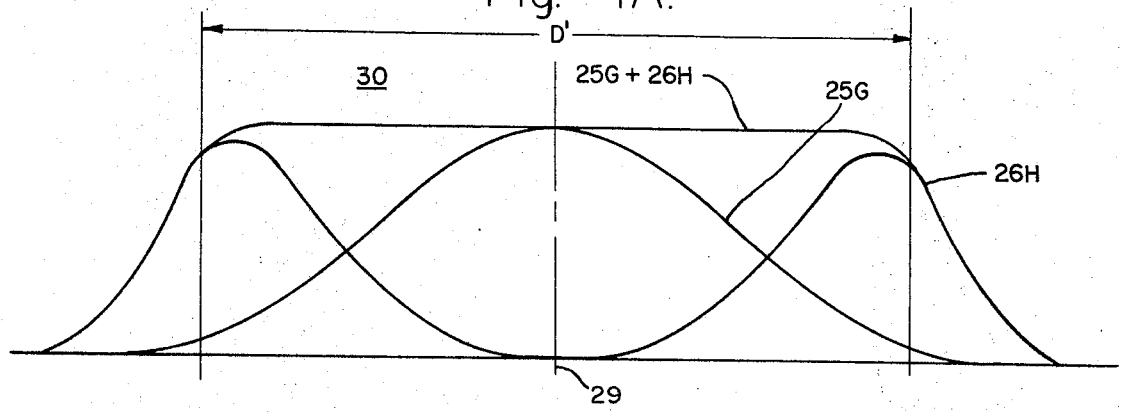
FIG. 4A is a flux density diagram of the densities produced on the target plane by the reflective rays G and H and their sum.
Figure 4B:
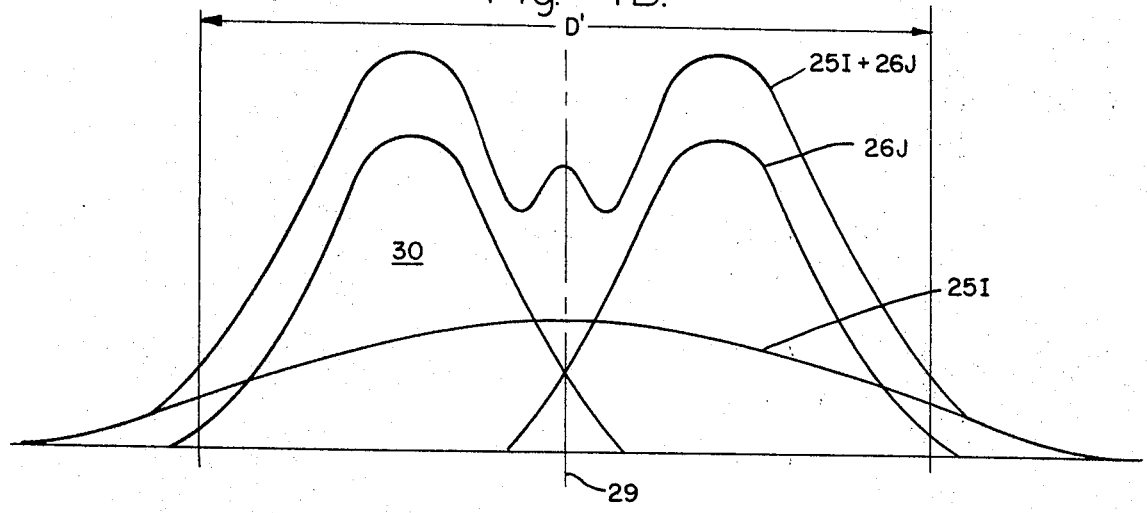
FIG. 4B is a flux density diagram illustrating the flux densities on the target plane produced by reflective rays I and J and their sum.
Figure 4C:
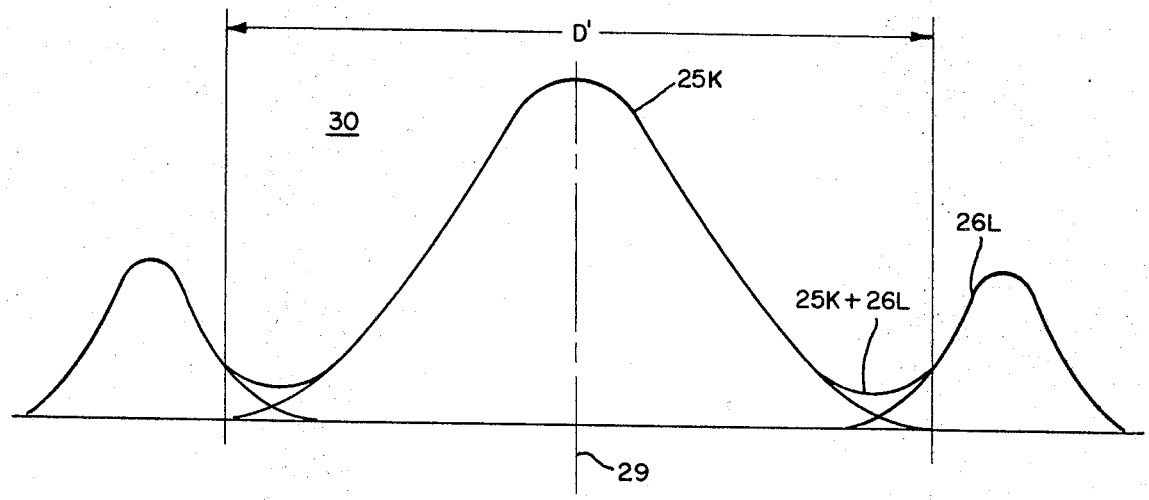
FIG. 4C is a flux density diagram illustrating the flux densities on the target plane produced by reflective rays K and L and their sum.

In FIGS. 4A, 4B and 4C, the results of the jump functions of the rays from the curves 25 and 26 are illustrated. In FIGS. 4B and 4C, flux densities are comparable to that shown in FIG. 1, as illustrated by curves 25I and 25K. The flux densities 26J and 26L on the target plane from the negatively reflected rays, unlike that shown in FIG. 1, are also indicated. Again, in FIGS. 4A, 4B and 4C, the sums of the flux densities from the two curves 25 and 26 are indicated by the curves 25G+26H, 25I+26J, and 25K+26L. It is seen that the sum 25G+26H provides a flux density on the target having a diameter D' which tends to approach the optimum uniform flux density as shown in FIG. 2, this depending on the contours of the curves 25 and 26, which provide the jump function, and on the axial position of the source hot spot.

The foregoing illustrates the method of combining two adjoining annular reflective curved surfaces, having different radii and from which reflective rays from the surfaces may be aimed at specific points on the target plane to produce circular bands having a nearly uniform or a maximum uniformity of flux density, whereby the specific curved surfaces from which the bands of light are reflected may be selectively arranged to form the continuous curve of an optimum collector for a predetermined radiant source.

A collector design was predetermined to encompass a solid angle about the source, from angles of 50° to 120° from the collector axis, measured from the direction opposite the target plane. For design purposes, this solid angle was divided into seven angular surfaces or arc portions of 10° each to determine a collector curve according to the invention. A spectrum of hot spot image radii on the target ($R_T$) was selected at various intervals from +11.50" to −8.50" and flux density over the entire target was calculated for each value of $R_T$. This provided a picture of the distribution from each 10° surface area for each radii selected. From this information, one radius was selected for each of the several 10° areas so as to produce the most uniform flux density on the target within the design target diameter.

The locations of the radial distances on the target plane determined for each of the seven 10° angular surface areas of the collector are as follows, the angles being designated as $\theta$ and the radial distances being designated as $R_T$.

| $\theta$ (theta): | $R_T$ |
|---|---|
| 110°–120° | −7.75 |
| 100°–110° | +11.50 |
| 90°–100° | +11.50 |
| 80°–90° | +10.50 |
| 70°–80° | +8.0 |
| 60°–70° | +9.50 |
| 50°–60° | +9.0 |

From this information, a sequence of equations was derived to define a continuous surface for a collector according to the invention.

These equations were determined from the geometric relationships as shown in FIGS. 5 and 6. In FIG. 5, there is shown an arc 32 representing an approximate collector surface which would extend symmetrically around an optical axis indicated by the line 35. The first focus of the collector is at the point 36, coincident with the hot spot of the illuminating source. Extending at an angle $\theta$ with the axis 35 at the point 36 is an incident ray or radius $\rho$. The incident ray terminates at the reflective surface of the collector at a point 38 which is the distance $(-X)$ along the optical axis from the first focus toward the reflective surface. Through the point 38 there is a tangent 37 to the curve 32 forming an angle $\alpha$ with the optical axis 35. Perpendicular to the tangent 37 is a normal line 33 forming the incident angle $i$ with the radius $\rho$ and forming the angle of reflection $i$ with the reflected ray 41. The reflected ray terminates at the target plane 42 on point 43 at a radius $R_T$ from the optical axis.

The target plane is a predetermined distance $L$ from the source 36 and the maximum diameter of the collector is indicated by the radius $Y_o$. Extending from the point 38 is a line 39 parallel to the optical axis and forming an angle $\beta$ with the reflected ray 41 and an angle $\alpha$ with the tangent 37. The angle at the point 38 formed by the tangent 37 and the radius $\rho$ is equal to $180°-(\alpha+\theta)$.

Then, geometrically, the distance $(-X)$, from the focus 36 to the point 38, equals $+\rho \cos \theta$ and similarly, the distance $Y$, from the point 38 to the optical axis, equals $\rho \sin \theta$. Other geometric relationships seen from FIG. 5 are indicated in the following:

$$\beta = 180° - (\alpha + \theta) - \alpha \text{ or } \beta = 180° - (2\alpha + \theta)$$
$$R_T = Y - (L-X) \tan \beta \text{ or }$$
$$R_T = \rho \sin \theta + (L + \rho \cos \theta) \tan (2\alpha + \theta)$$

Further, $$dY = \rho \cos \theta d\theta + \sin \theta d\rho; \quad dX = \rho \sin \theta d\theta - \cos \theta d\rho$$

and $$\frac{dY}{dX} = \tan \alpha = \frac{\rho \cos \theta + \sin \theta \left(\frac{d\rho}{d\theta}\right)}{\rho \sin \theta - \cos \theta \left(\frac{d\rho}{d\theta}\right)}$$

For a collector, $R_T$, the radius at the target plane 42 for a particular angle $\theta$ is a function of that angle, where: $L$, $Y_o$, $\theta_{max}$ and $\theta_{min}$ are known or easily determinable. Then, to determine the contour of an optimum collector mathematically, the values of $\rho$ as functions of the corresponding values of $\theta$ must be found. Thus, in the following, an auxiliary or supplemental method for determining an optical collector is indicated. The contour of the subject collector is determined mathematically and generally expressed as a function of $R_T = f(\theta)$. Similarly, the contour of a collector may be found where the contour is substantially a function of $R_T = f(\theta)$. From what has been previously shown, when $Y = Y_o$; $\theta_o = \theta_{max}$, then:

$$\rho_o = \frac{Y_o}{\sin \theta_o}; \quad \tan(2\alpha_o + \theta_o) = \frac{-\rho_o \sin \theta_o + (R_T)_o}{L + \rho_o \cos \theta_o}$$
$$\alpha_o = 1/2[(2\alpha_o + \theta_o) - \theta_o]$$
$$\left(\frac{dY}{dX}\right)_o = \tan \alpha_o$$
$$\left(\frac{d\rho}{d\theta}\right)_o = \frac{\rho_o \left[\left(\frac{dY}{dP}\right)_o \sin \theta_o - \cos \theta_o\right]}{\left(\frac{dY}{dX}\right)_o \cos \theta_o + \sin \theta_o}$$
$$\rho_1 = \rho_o - \left(\frac{d\rho}{d\theta}\right)_o \Delta\theta = \rho_o \left[1 - \frac{1}{\rho_o}\left(\frac{d\rho}{d\theta}\right)_o \Delta\theta\right] = \rho_o[1 - E_o]$$

where:

$$K_o = \frac{1}{\rho_o}\left(\frac{d\rho}{d\theta}\right)_o \Delta\theta$$

and $$\theta_1 = \theta_o - \Delta\theta$$

Thus, in general, for a given value of $n$:

$$\theta_n = \theta_o - n\Delta\theta; \quad (R_T)_n = f(\theta_n); \quad \rho_n = \rho_{n-1}[1 - K_{n-1}]$$

or $$\rho_n = \rho_o[(1-K_{n-1})(1-K_{n-2}) \ldots (1-K_o)]$$

where $$K_N = \left[\frac{\tan \alpha_N \sin \theta_N - \cos \theta_N}{\tan \alpha_N \cos \theta_N + \sin \theta_N}\right] \Delta\theta$$
$$\alpha_N = 1/2\left[\tan^{-1}\left\{\frac{(R_T)_N - \rho_N \sin \theta_N}{L + \rho_N \cos \theta_N}\right\} - \theta_N\right]$$

and $$N = (n-1), (n-2), (n-3) \ldots (n-n)$$

Considering a specific collector, where $\theta_o = 120°$, $Y_o = 10''$, $L = 214.77''$, $\Delta\theta = 20$ min. and $\rho_o = 11.55''$, the foregoing values being predetermined, it has been found for maximum uniformity that for $\theta_n$ from 120° to 110°, $(R_T)_n = -7.75$ inches, a constant; for $\theta_n$ from 110° to 90°, $(R_T)_n = 11.50''$, a constant; and for $\theta_n$ from 90° to 50°, $$(R_T)_n = [(1.75 - 1.43\theta_n)(1 + \cos 12\theta_n) + 8]$$

the latter two values for $\theta$ being expressed in radians. By substituting these values into the above equations for $\rho_N$ and $\alpha_N$, the values of the tangent angle and the various $\rho$ values are determined so that a collector curve according to the invention can be drawn, the collector being such to provide a substantially uniform flux density on the target plane.

Referring to FIG. 6, there is shown a collector curve 47 having an optical axis 48 with the first focus or hot spot of the source at a point 49. The arc length of the source, that is, the distance between an anode 50 and a cathode 51, is indicated as $h$. The latus rectum $P$, the perpendicular to the axis and extending from the hot spot to the curve in the direction of an incident ray, has a reflected ray to produce the image of the hot spot on the second focus at 53 on the target plane 54 at a radius $R_T$. A magnified arc length $H$ is also indicated on the second focal plane, subtended between the reflected rays 55 and 56. For the specific collector above, having a $Y_o$ of 10'', the lactus rectum is equal to 5.8622'' and the arc length, $h$, is equal to 0.354''. The magnified arc length $H$ is equal to $(L/P)h$, and for the collector in question, equals 12.96''. Then, to normalize the equations for the above specific collector so that any other collector surface may be derived from it, multiply each value by the term $(H/12.96)$. For example, the maximum $Y$ in any system, $Y_o'$, is determined as:

$$Y_o' = \frac{10}{12.96} H = 0.77H$$

Further, the constants for $(R_T)_n$ of $-7.75''$, $11.50''$ and $[(1.75-1.43\ \theta_n)(1+\cos 12\ \theta_n)+8]$ are for any collector normalized to be equal to $-0.60H$, $0.89H$ and $$[(0.135-0.111\ \theta_n)(1+\cos 12\ \theta_n)+0.618]H$$

respectively, $\theta$ being expressed in radians.

For the specific collector surface determined, $R_Q$, the permissible radius of the quartz enclosure of the source is 2.75 inches and to normalize the sum of the permissible radius of the source enclosure and of the arc length, that is, $$R_Q' = R_Q + h = \frac{(2.75+0.354)}{12.96}$$

$H=0.240H$.

Thus, for any collector where the permissible radius $R_Q$ and the arc length $h$ are known, the magnified arc length $H$ can be found in the equation $$H = \frac{R_Q'}{.240}$$

For the specific collector discussed above, the values of $\rho/H$ for any value of $\theta$ are known, and where $H'$ is the magnified arc length for a collector to be designed, the value of the radius $\rho'$ for any value of $\theta$ for a second or subsequent collector may be determined from the equation $$\rho' = H'\left(\frac{\rho}{H}\right)$$

These values of $\rho'$ can then be applied in relation to the values of $\theta$ for the first collector to design the contour of a second or subsequent collector that will produce a nearly uniform distribution of flux densities on a target plane perpendicular to the optical axis.

Figure 7:
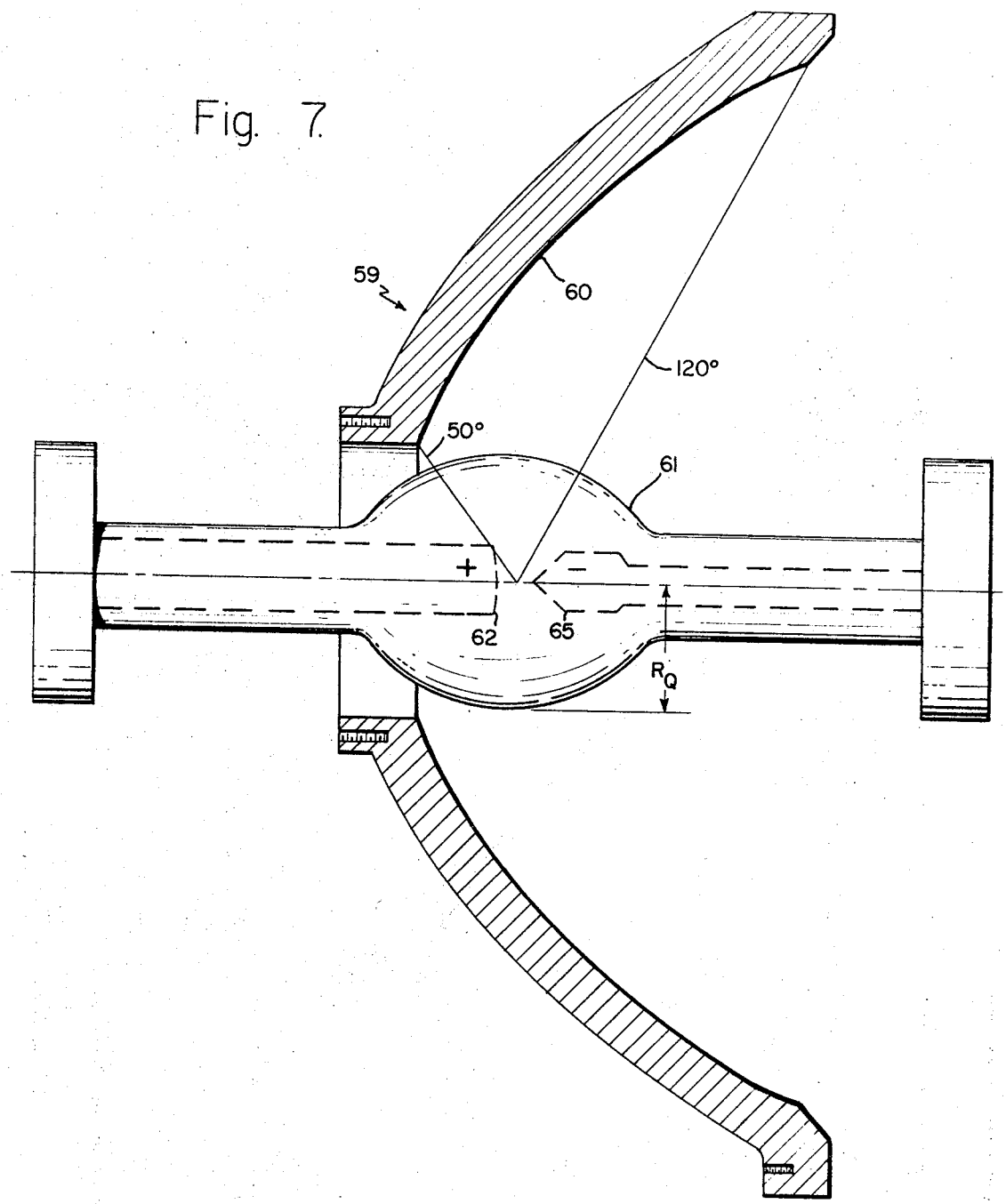
FIG. 7 is a cross-sectional view of an illumination source within a collector made according to the invention.

In FIG. 7, there is shown a water cooled collector 59 having an arc or annular reflective surface 60 made according to the first specific collector requirements stated above. The collector has a 20 kw. xenon compact arc lamp having a 5½″ diameter quartz enclosure 61 at the arc, the permissible radius $R_Q$ for the enclosure being 2.75″. The anode 62 is spaced from the cathode 65 by a distance or arc length $h$ equal to 0.354″. The anode and cathode are copper, both being water cooled internally. The reflective arc 60 subtends a total angle of from 50° to 120° measured from the small end of the collector. A highly polished surface is finished on the reflective surface.

In summary, we have disclosed an invention which includes the following:

(1) A collector and method for making the same which produces a uniform flux density of light on a target plane by means of a positive $R_T$ jump function.

(2) A collector and method for making the same which produces a uniform flux density of light on a target plane by means of a negative $R_T$ jump function.

(3) A collector and method for making the same but which further maximizes uniformity of the distribution of light on a target plane by means of a positive jump function feature combined with focusing adjustment of the light source along the optical axis.

(4) A collector and method for making the same but which further maximizes uniformity of the distribution of light on a target plane by means of a negative jump function feature combined with focusing adjustment of the light source along the optical axis.

(5) A collector and method for making the same in which the contour of the reflected surface is determined by the specific function of hot spot target radius on the target plane, where $R_T=-7.75″$, $\theta=120°-110°$;

$$R_T = 11.50″$$

$\theta=110°-90°$;
$(R_T)_n=(1.75-143\ \theta_n)(1+\cos 12\ \theta_n)+8$, $\theta=90°-50°$;
or of the functions of $R_T$ and $\theta$ which are substantially in accordance with the above equations.

(6) Collectors which are scaled versions of the optimum collector of paragraph 5 above.

The invention and its attendant advantages will be understood from the foregoing description, and it will be apparent that various changes may be made in the form, construction and arrangement of the invention without department from the spirit and scope thereof or sacrificing its material advantages, the arrangements hereinbefore described as being merely by way of example. We do not wish to be restricted to the specific forms shown or uses mentioned, except as defined by the accompanying claims, wherein various portions have been separated for clarity of reading and not for emphasis.

We claim:

1. A method of determining the reflection surface of a collector for producing a nearly uniform distribution of flux density from its radiant power source on a target plane perpendicular to the optical axis of the collector, comprising:

(a) generating a first curved annular reflective surface so that an image of the radiant source is in the form of a circular band at a selected portion on the target plane; and (b) generating a second curved annular reflective surface adjoining said first curved surface so that an image of the radiant source is in the form of a second circular band at a selected portion on the target plane, (c) the two bands are generated so that their centers are on the optical axis of the radiant source, and (d) said curved surfaces generating bands having complementary flux density fields so that the sum of the fields is nearly uniform over a circular target.

2. The method according to claim 1 in which:
the curved surfaces generate circular bands having positively extending radii with respect to the optical axis as indicated by the incident rays to the curved surfaces and the reflected rays from the curved surfaces to the target plane being entirely on the same side of the optical axis in side elevational cross-sectional view.

3. The method according to claim 1 in which:
the curved surfaces generate at least one of the circular bands with a negatively extending radius with respect to the optical axis as indicated by at least one reflected ray from the curved surfaces to the target plane crossing the optical axis in side elevational cross-sectional view.

4. The method according to claim 1 in which uniformity of the flux densities is maximized by the step of:
adjusting the position of the radiant source on the optical axis to increase the uniformity of the flux densities in the bands.

5. The method according to claim 2 in which uniformity of the flux densities is maximized by the step of:
adjusting the position of the radiant source on the optical axis to increase the uniformity of the flux densities in the bands.

6. The method according to claim 3 in which uniformity of the flux densities is maximized by the step of:
adjusting the position of the radiant source on the optical axis to increase the uniformity of the flux densities in the bands.

7. A method of determining the reflection surface of a collector for producing a nearly uniform distribution of flux density from its radiant power source on a target plane perpendicular to the optical axis of the collector, comprising:

(a) generating a plurality of adjoining curved annular reflective surface portions having different radii for reflecting images of the radiant source in the form of a circular band at selected portions of the target plane.

(b) the two bands are generated so that their centers are on the optical axis of the radiant source.

(c) generating the radius of specific bands that have nearly uniform flux densities on the target plane, and (d) generating specific portions of said surface portions reflecting said specific bands so that the reflective surface of the collector is formed.

8. The method according to claim 7 in which:
the curved surfaces generate the circular bands with positively extending radii with respect to the optical axis as indicated by the incident rays to the curved surface portions and the reflected rays from the latter portions of the target plane being entirely on the same side of the optical axis in side elevational cross-sectional view.

9. The method according to claim 7 in which:
the curved surfaces generate at least one of the circular bands with a negatively extending radius with respect to the optical axis as indicated by at least one reflected ray from the curved surface portions to the target plane crossing the optical axis in side elevational cross-sectional view.

10. The method according to claim 7 in which uniformity of the flux densities is maximized by the step of:
adjusting the position of the radiant source on the optical axis to increase the uniformity of the flux densities in the bands.

11. The method according to claim 8 in which uniformity of the flux densities is maximized by the step of:
adjusting the position of the radiant source on the optical axis to increase the uniformity of the flux densities in the bands.

12. The method according to claim 9 in which uniformity of the flux densities is maximized by the step of:
adjusting the position of the radiant source on the optical axis to increase the uniformity of the flux densities in the bands.

13. The method according to claim 7 in which the curved surfaces are generated so that the individual circles forming the bands are in accordance with the following equations:

$$\rho_o = \frac{Y_o}{\sin \theta_o}; \quad \rho_n = \rho_o[(1-K_{n-1})(1-K_{n-2}) \ldots (1-K_o)]$$

$$K_N = \left[\frac{\tan \alpha_N \sin \theta_N - \cos \theta_N}{\tan \alpha_N \cos \alpha_N + \sin \theta_N}\right] \Delta\theta$$

$$\alpha_N = 1/2\left[\tan^{-1}\left(\frac{(R_T)_N - \rho_N \sin \theta_N}{L + \rho_N \cos \theta_N}\right) - \theta_N\right]$$

where $N=(n-1), (n-2), (n-3) \ldots (n-n)$; $Y_o$ is the maximum radius of the collector and perpendicular to the optical axis; $\rho_n$ is a radius for any point on the collector curve forming an angle $\theta_N$ with the optical axis and extending from the radiant source hot spot in the position of an incident ray to the collector; $\rho_o$ is the collector radius extending from the hot spot and being for a predetermined maximum target radius and the predetermined maximum value of $\theta$; $\alpha_N$ is the angle formed by a tangent extending from the optical axis of the point on the collector curve where it is intersected by the radius $\rho_o$; $\theta_o$ is the predetermined maximum value of $\theta$; $\nabla \theta$ is a predetermined increment of value of $\theta$ based on $$\theta_n = \theta_o - n\nabla\theta;$$

$\theta_n$ being any value of $\theta$ as determined from $\theta_o$ less a multiple of $\nabla\theta$; $\alpha_N$ being a value determined from a corresponding value of $\theta$; L is the distance from the source hot spot to the target plane; and $(R_T)_N$ is any mean radius of a circular band of reflected light on the target plane determined for a particular $\theta_N$.

14. The method according to claim 13 wherein the collector curve is further defined for specific values of $\theta_n$:
where
$$\theta_n = 120° \text{ to } 110°, (R_T)_n = -0.60H$$
where
$$\theta_n = 110° \text{ to } 90°, (R_T)_n = +0.89H$$

where
$$\theta_n = 90° \text{ to } 50°, (R_T)_n = [(0.135-0.111\theta_n)(1-\cos 12\theta_n)+0.618]H$$

where H is the magnified arc length of the source of the target plane and is equal to $(L/P) h$; $h$ is the source arc length and P is the length of the perpendicular (latus rectum) from the center of the arc length at the optical axis to the collector curve.

15. The method according to claim 14 wherein the collector curve is further defined for specific values of $\theta_n$:
where
$$\theta_n = 120° \text{ to } 110°, (R_T)_n = -7.75$$
where
$$\theta_n = 110° \text{ to } 90°, (R_T)_n = +11.50$$
where
$$\theta_n = 90° \text{ to } 50°, (R_T)_n = [(1.75-1.43\theta_n)(1+\cos 12\theta_n)+8]$$
$P=5.8622; L=214.773; h=0.354; H=12.96; \rho_o=11.55$
and
$$\theta_o = 120°$$

16. A collector having a curved reflective surface for producing a nearly uniform distribution of flux density from its radiant power source on a target plane perpendicular to the optical axis of the collector, the curved surface of the collector being defined by:

$$\rho_o = \frac{Y_o}{\sin \theta_o}; \quad \rho_n = \rho_o[(1-K_{n-1})(1-K_{n-2}) \ldots (1-K_o)]$$

$$K_N = \left[\frac{\tan \alpha_N \sin \theta_N - \cos \theta_N}{\tan \alpha_N \cos \theta_N + \sin \theta_N}\right] \Delta\theta$$

$$\alpha_N = 1/2\left[\tan^{-1}\left(\frac{(R_T)_N - \rho_N \sin \theta_N}{L + \rho_N \cos \theta_N}\right) - \theta_N\right]$$

where $N=(n-1), (n-2), (n-3) \ldots (n-n)$; $Y_o$ is the maximum radius of the collector and perpendicular to the optical axis; $\rho_n$ is a radius for any point on the collector curve forming an angle $\theta_N$ with the optical axis and extending from the radiant source hot spot in the position of an incident ray to the collector; $\rho_o$ is the collector radius extending from the hot spot and being for a predetermined maximum target radius and the predetermined maximum value of $\theta$; $\alpha_N$ is the angle formed by a tangent extending from the optical axis of the point on the collector curve where it is intersected by the radius $\rho_o$; $\theta_o$ is the predetermined maximum value of $\theta$; $\Delta\theta$ is a predetermined incremental value of $\theta$ based on $\theta_n = \theta_o - n\Delta\theta$; $\theta_n$ being any value of $\theta$ as determined from $\theta_o$ less a multiple of $\Delta\theta$; $\alpha_N$ being a value determined from a corresponding value of $\theta$; L is the distance from the source hot spot to the target plane; and $(R_T)_N$ is any mean radius of a circular band of reflected light on the target plane determined for a particular $\theta_N$.

17. The collector according to claim 16 in which the collector curve is further defined for specific values of $\theta_n$:
where
$$\theta_n = 120° \text{ to } 110°, (R_T)_n = -0.60H$$
where
$$\theta_n = 110° \text{ to } 90°, (R_T)_n = +0.89H$$
where
$$\theta_n = 90° \text{ to } 50°, (R_T)_n = [(0.135-0.111\theta_n)(1+\cos 12\theta_n)+0.618]H$$

where H is the magnified arc length of the source of the target plane and is equal to $(L/P)h$; $h$ is the source arc length and P is the length of the perpendicular (latus rectum) from the center of the arc length at the optical axis to the collector curve.

18. The collector according to claim 17 in which the collector curve is further defined for specific value of $\theta_n$ and specific values of the mean radii of three constant circular rasters:
where
$$\theta_n = 120° \text{ to } 110°, (R_T)_n = -7.75$$
where
$$\theta_n = 110° \text{ to } 90°, (R_T)_n = +11.50$$
where
$$\theta_n = 90° \text{ to } 50°, (R_T)_n = [(1.75 - 1.43\theta_n)(1 + \cos 12\theta_n) + 8]$$
where
$P = 5.8622; L = 214.773; h = 0.354; H = 12.96; \rho_0 = 11.55$
and
$$\theta_0 = 120°$$

19. A second collector having a curved reflective surface for producing a nearly uniform distribution of flux density from its radiant power source on a target plane perpendicular to the optical axis in which the contour of the second collector is determined from the contour of a first collector which produces a nearly uniform distribution of flux density from its radiant power source on a target plane perpendicular to its optical axis, the two collectors having different specification requirements, the second collector being defined by;
 (a) a plurality of radii $\rho'$ extending to the reflective surface from the hot spot of the source on the optical axis of the second collector,
 (b) the radii $\rho'$ being positioned at elemental angles $\theta$ with the optical axis, the values of $\theta$ being those formed with corresponding radii $\rho$ on the first collector,
 (c) wherein $H' = R'_Q/0.240$, $H'$ being the magnified arc length of the source of the second collector on the target plane, and $R_Q'$ being the sum of arc length of the source and of the permissible radius of the enclosure of the second collector, and
 (d) the values of the radii $\rho$ being determined by multiplying $H'$ by the known values of $\rho/H$ or the first collector, whereby
$$\rho' = H'(\rho/H)$$

20. A collector having a curved reflective surface for producing a nearly uniform distribution of flux density from its radiant power source on a target perpendicular to the optical axis of the collector, comprising:
 (a) a curved annular reflective surface for producing an image of the radiant source of the collector in the form of a circular bands at a selected portion of the target plane; and
 (b) a second curved annular reflective surace for producing an image of the radiant source of the collector in the form of a second circular band at a selected portion of the target plane,
 (c) said bands having their centers on the optical axis of the radiant source,
 (d) said curved surfaces adjourning and having different radii,
 (e) said curved surfaces being adapted to produce bands having flux densities that are nearly uniform.

21. The invention according to claim 20 in which the curved surfaces produce circular bands having positively extending radii with respect to the optical axis as indicated by the incident rays to the curved surfaces and the reflected rays from the curved surfaces to the target plane entirely on the same sides of the optical axis in side elevational cross-sectional view.

22. The invention according to claim 20 in which:
 at least one of the curved surfaces produces a circular band having a negatively extending radius with respect to the optical axis as indicated by at least one reflected ray from the curved surfaces to the target plane crossing the optical axis in side elevational cross-sectional view.

23. The invention according to claim 20 in which:
 the radiant source is adjustably positioned on the optical axis with respect to said curved surfaces to provide a maximum uniformity of the flux densities of the bands.

24. The invention according to claim 21 in which:
 the radiant source is adjustably positioned on the optical axis with respect to said curved surfaces to provide a maximum uniformity of the flux densities of the bands.

25. The invention according to claim 22 in which:
 the radiane source is adjustably positioned on the optical axis with respect to said curved surfaces to provide a maximum uniformity of the flux densities of the bands.

References Cited

UNITED STATES PATENTS

| | | | |
|---|---|---|---|
| 1,421,506 | 7/1922 | Limpert | 240—41.35 |
| 2,192,886 | 3/1940 | Bergmans et al. | 240—11.4 |
| 2,771,001 | 11/1956 | Gretener | 240—41.35 |
| 3,291,976 | 12/1966 | Rosenblatt | 240—41.35 |
| 3,449,561 | 6/1969 | Basil et al. | 240—41.35 XR |

FOREIGN PATENTS 832,378  4/1960  Great Britain.

JOHN M. HORAN, Primary Examiner

R. P. GREINER, Assistant Examiner

U.S. Cl. X.R.

240—41.35